(12) United States Patent
Harvey

(10) Patent No.: US 6,224,364 B1
(45) Date of Patent: May 1, 2001

(54) INJECTION MOLDING PRODUCTS HAVING FASTENER ELEMENTS

(75) Inventor: Andrew C. Harvey, Waltham, MA (US)

(73) Assignee: Velcro Industries B.V. (NL)

( * ) Notice: Subject to any disclaimer, the term of this patent is extended or adjusted under 35 U.S.C. 154(b) by 0 days.

(21) Appl. No.: 09/158,442

(22) Filed: Sep. 21, 1998

(51) Int. Cl.$^7$ .................................................. B29C 45/13
(52) U.S. Cl. .................. 425/130; 264/328.7; 264/328.8; 425/572; 425/573
(58) Field of Search ..................................... 425/120, 130, 425/570, 572, 573; 264/328.7, 328.8

(56) References Cited

U.S. PATENT DOCUMENTS

| | | |
|---|---|---|
| 700,606 | 5/1902 | Barnes . |
| 2,499,898 | 3/1950 | Anderson . |
| 3,031,730 | 5/1962 | Morin . |
| 3,101,517 | 8/1963 | Fox et al. . |
| 3,147,528 | 9/1964 | Erb . |
| 3,192,589 | 7/1965 | Pearson . |
| 3,266,113 | 8/1966 | Flanagan Jr. . |
| 3,312,583 | 4/1967 | Rochlis . |
| 3,507,010 | 4/1970 | Doleman et al. . |
| 3,669,598 | 6/1972 | Tucker . |
| 3,708,833 | 1/1973 | Ribich et al. . |
| 3,752,619 | 8/1973 | Menzin et al. . |
| 3,927,881 | 12/1975 | Lemelson et al. . |
| 4,155,698 | 5/1979 | Aichinger . |
| 4,169,303 | 10/1979 | Lemelson . |
| 4,470,857 | 9/1984 | Casalou . |
| 4,561,456 | 12/1985 | Gueret . |
| 4,563,380 | 1/1986 | Black et al. . |
| 4,673,542 | 6/1987 | Wigner et al. . |
| 4,693,921 | 9/1987 | Billarant et al. . |
| 4,712,414 | 12/1987 | Northup et al. . |
| 4,725,221 | 2/1988 | Blanz . |
| 4,726,975 | 2/1988 | Hatch . |
| 4,775,310 | 10/1988 | Fischer . |
| 4,840,339 | 6/1989 | Grogan . |
| 4,842,916 | 6/1989 | Ogawa et al. . |
| 4,881,997 | 11/1989 | Hatch . |

(List continued on next page.)

FOREIGN PATENT DOCUMENTS

| | | |
|---|---|---|
| 32 44 410 A1 | 10/1983 | (DE) . |
| 3301210 A1 | 7/1984 | (DE) . |
| 54-101854 | 8/1979 | (JP) . |
| 55-114541 | 9/1980 | (JP) . |

Primary Examiner—Tim Heitbrink
(74) Attorney, Agent, or Firm—Fish & Richardson, P.C.

(57) ABSTRACT

An injection molded product, having an array of fastener elements integrally molded with and extending from a surface of the product, is molded in a closed cavity die. One half of the die has a mold surface with a region having an array of fastener element cavities extending therefrom for molding the fastener elements. The other half of the die has a mold surface aligned with the mold surface of the first mold part to define therebetween, in a closed condition, a mold cavity constructed to receive molten plastic for molding the product. The mold cavity includes a first portion comprising a majority of the volume of the mold cavity, and a second portion contiguous with the first portion and defined in part by the region of the first mold part surface having the array of fastener element cavities. At least one of the first and second mold parts has a moveable segment constructed to be retracted across the mold cavity, between filling of the first portion of the mold cavity with said plastic and filling of the fastener element cavities with said plastic, to enable the fastener element cavities and the first portion of the mold cavity to be filled under different molding conditions. In some cases, the fastener elements are molded of a different material than other portions of the molded product. The injection mold is particularly useful for molding large functional products that include small arrays of miniature fastener elements, such as for hook-and-loop fastening.

11 Claims, 6 Drawing Sheets

U.S. PATENT DOCUMENTS

| | | |
|---|---|---|
| 4,897,032 | 1/1990 | Corteggiani . |
| 4,984,339 | 1/1991 | Provost et al. . |
| 5,125,816 * | 6/1992 | Morita ................................ 425/130 |
| 5,201,100 | 4/1993 | Cardinale . |
| 5,242,646 | 9/1993 | Torigoe et al. . |
| 5,368,549 | 11/1994 | McVicker . |
| 5,460,769 | 10/1995 | Kaneko . |
| 5,606,781 | 3/1997 | Provost et al. . |
| 5,656,226 | 8/1997 | McVicker . |

* cited by examiner

INJECTION MOLDING PRODUCTS HAVING FASTENER ELEMENTS

BACKGROUND OF THE INVENTION

The invention relates generally to molded products with fastener elements for use in hook-and-loop fastening and the like.

Hook-and-loop fasteners typically have two components: a "loop" component with engageable fiber loops, either of a woven or non-woven fabric or matt, and a mating "hook" component with a large number of miniature fastener elements, sometimes of hook form or mushroom form, adapted to engage and retain the loops of the loop component. Although early hook components were woven, many advances have been made in their manufacture, such that now many hook components are economically molded, with the fastener elements integrally molded upon a common sheet-form base. Fischer, for example, teaches such a method in U.S. Pat. No. 4,794,028, in which the fastener elements are molded in individual closed cavities in a mold roll, and then stripped from their closed cavities by peeling the fastener "tape" from the surface of the mold roll. Molded fastener elements of fasteners intended for repetitive use are generally engineered with shapes and resins selected to provide an appropriate amount of strength and flexibility, such that the fastener will have the required retention strength and yet not tend to damage the engaged loops when peeled apart. Customarily, such sheet-form fastener components have been formed in continuous strips, and then cut and affixed to the surfaces wished to be separably joined.

In some cases, loop-engageable fastener elements have been injection molded as part of a relatively stiff product. For example, Mcvicker, in U.S. Pat. No. 5,656,226, illustrates an array of fastener elements being integrally molded with a surface of an ankle brace.

Although injection molding fastener elements integrally and in place upon a product avoids the step of subsequently attaching a strip of fastener "tape" to the product for assembly, such a process places some limitations upon the structure of the fastener elements that are not present with some continuous forming techniques. For example, filling very small fastener element cavities can require high pressures and fast flows to avoid chilling the resin before the cavities have sufficiently filled. Depending upon the size and geometry of the overall injected product, filling an array of such cavities in a relatively small region of a surface of the product can complicate the design of the gate and runner systems. If the entire mold cavity is filled in one shot, the molten plastic may initially flow across the openings of the fastener element cavities, without completely filling them. The plastic may then cool to a temperature that prevents further flow or requires extremely high pressures to fill the cavities. In addition, one-shot injection of an entire product having a small array of miniature fastener elements from a single flow of resin requires the resin of the entire product to have qualities appropriate for fastener element strength and flexibility. In some instances there may be a more economical choice of resins for the bulk of the product which will be foregone in order to ensure reliable fastener elements, and in some other cases the quality of the fastener elements may be mitigated in the selection of a resin more suitable for the rest of the product.

SUMMARY OF THE INVENTION

The invention features an injection mold for forming a molded product having an array of fastener elements integrally molded with and extending from a surface of the product.

According to one aspect of the invention, an injection mold is provided, having first and second mold parts. The first mold part has a mold surface with a region having an array of fastener element cavities extending therefrom for molding the fastener elements. The second mold part has a mold surface aligned with the mold surface of the first mold part to define therebetween, in a closed condition, a mold cavity constructed to receive molten plastic for molding the product. The mold cavity includes a first portion comprising a majority of the volume of the mold cavity, and a second portion contiguous with the first portion and defined in part by the region of the first mold part surface having the array of fastener element cavities. At least one of the first and second mold parts has a moveable segment constructed to be retracted across the mold cavity, between filling of the first portion of the mold cavity with the plastic and filling of the fastener element cavities with the plastic, to enable the fastener element cavities and the first portion of the mold cavity to be filled under different molding conditions.

For molding some products, the first portion of the mold cavity comprises more than about 75 percent, and in some cases more than 90 percent, of the volume of the mold cavity.

In some embodiments, the moveable segment is constructed to be retracted across the mold cavity, after the first portion of the mold cavity has substantially filled with plastic, from a flow-inhibiting position to a the flow-enabling position. In its flow-inhibiting position, moveable segment inhibits flow of the molten plastic into the second portion of the mold cavity and the fastener element cavities while the first portion of the mold cavity is substantially filled with plastic. In its flow-enabling position, the moveable segment enables flow of the plastic into the second portion of the mold cavity and the fastener element cavities.

In some cases the first mold part includes the moveable segment, the segment having a surface including the region with the array of fastener element cavities. In some of these cases, the movable segment is constructed to further retract, after the fastener element cavities have filled, from its flow-enabling position to pull the molded fastener elements from their cavities.

In some other instances, the second mold part includes the moveable segment, the segment being arranged opposite the array of fastener element cavities of the first mold part. In some of these instances the moveable segment also includes a gate for filling the second portion of the mold cavity.

In some embodiments in which the moveable segment is constructed to be retracted across the mold cavity, after the first portion of the mold cavity has substantially filled with plastic, from a flow-inhibiting position to a flow-enabling position, the moveable segment inhibits flow of the molten plastic, in its flow-inhibiting position, into some of the second portion of the mold cavity while the fastener element cavities are filled with plastic. In its flow-enabling position, the moveable segment then enables flow of the molten plastic into all remaining unfilled regions of the second portion of the mold cavity.

In some embodiments, the fastener element cavities are defined entirely by surfaces which remain in fixed position relative to each other throughout molding and release of the fastener elements.

The segment is preferably constructed, in some cases, to be moved across the mold cavity to contact, in its flow-inhibiting position, an opposite surface defining the mold cavity. The segment and the opposite surface may together define a seal to block flow to the fastener element cavities with the segment in its flow-inhibiting position.

In some embodiments, the mold defines both a first gate and a second gate arranged to provide molten plastic to the mold cavity, with the first gate arranged to provide molten plastic to substantially fill the fastener element cavities and the second gate arranged to provide molten plastic to substantially fill the first portion of the mold cavity. In some particularly advantageous examples, the first gate is constructed to provide a different type of molten plastic than the second gate.

According to another aspect of the invention, a method of forming a molded product having an array of fastener elements integrally molded with and extending from a surface of the product is provided. The method employs the above-described mold, having various combinations of the above-described mold features, and includes the steps of:

(1) substantially filling one of the group consisting of the first portion of the mold cavity and the array of fastener element cavities;

(2) retracting a moveable segment of the mold across the mold cavity;

(3) filling the other of the group consisting of the first portion of the mold cavity and the array of fastener element cavities; and (4) opening the mold to remove the molded product.

In some embodiments, the first portion of the mold cavity is substantially filled before the moveable segment is retracted, the moveable segment being retracted to enable flow of molten plastic into the second portion of the mold cavity and the fastener element cavities.

In some other embodiments, the fastener element cavities are filled before the moveable segment is retracted, the moveable segment being retracted to enable filling of portions of the second portion of the mold cavity exposed by the moveable segment during its retraction.

In some instances the first portion of the mold cavity is filled with a first flow of molten plastic, and the array of fastener element cavities are filled with a second flow of molten plastic. These first and second flows of plastic may advantageously be of different material properties.

Another aspect of the invention provides an injection molded product formed substantially of one plastic material and having an array of fastener elements, of another plastic material, integrally molded with and extending from a region of a broad surface of a rigid plastic base.

By "substantially", as used in this sense, we mean that the majority of the volume of the product is made up of the one plastic material. In some cases, more than 75 percent, and in some instances more than 90 percent, of the volume of the product is made up of the one plastic material.

In some embodiments the array of fastener elements occupies an area less than about 5 percent (or, in some cases, less than about 2 percent) of the surface area of the product.

The plastic material forming the majority of the volume of the product may advantageously have, in some cases, a substantially higher elastic modulus than the plastic material of the fastener elements.

The product of the invention may be suitably formed by the above-described method and mold.

Among other advantages, the invention facilitates the molding of a large product having fastener elements extending from a surface, by molding the fastener elements in a separate step from the molding of the remainder of the product. This permits injecting molten plastic into the fastener cavities at high temperatures and under high pressures to ensure complete filling of the fastener cavities and the formation of fastener elements with desired shapes. Products may also be molded in a single die, having fastener elements made of one material and other portions of the products, free of fastener elements, made of a different material. In some cases, engineering plastics may be used to form fastener elements having specific properties, such as high stiffness, for enhancing loop-engaging ability while molding the remainder of the product from a less expensive plastic.

Other features and advantages will be apparent from the following detailed description, and from the claims.

DESCRIPTION OF EMBODIMENTS

Figure 1:
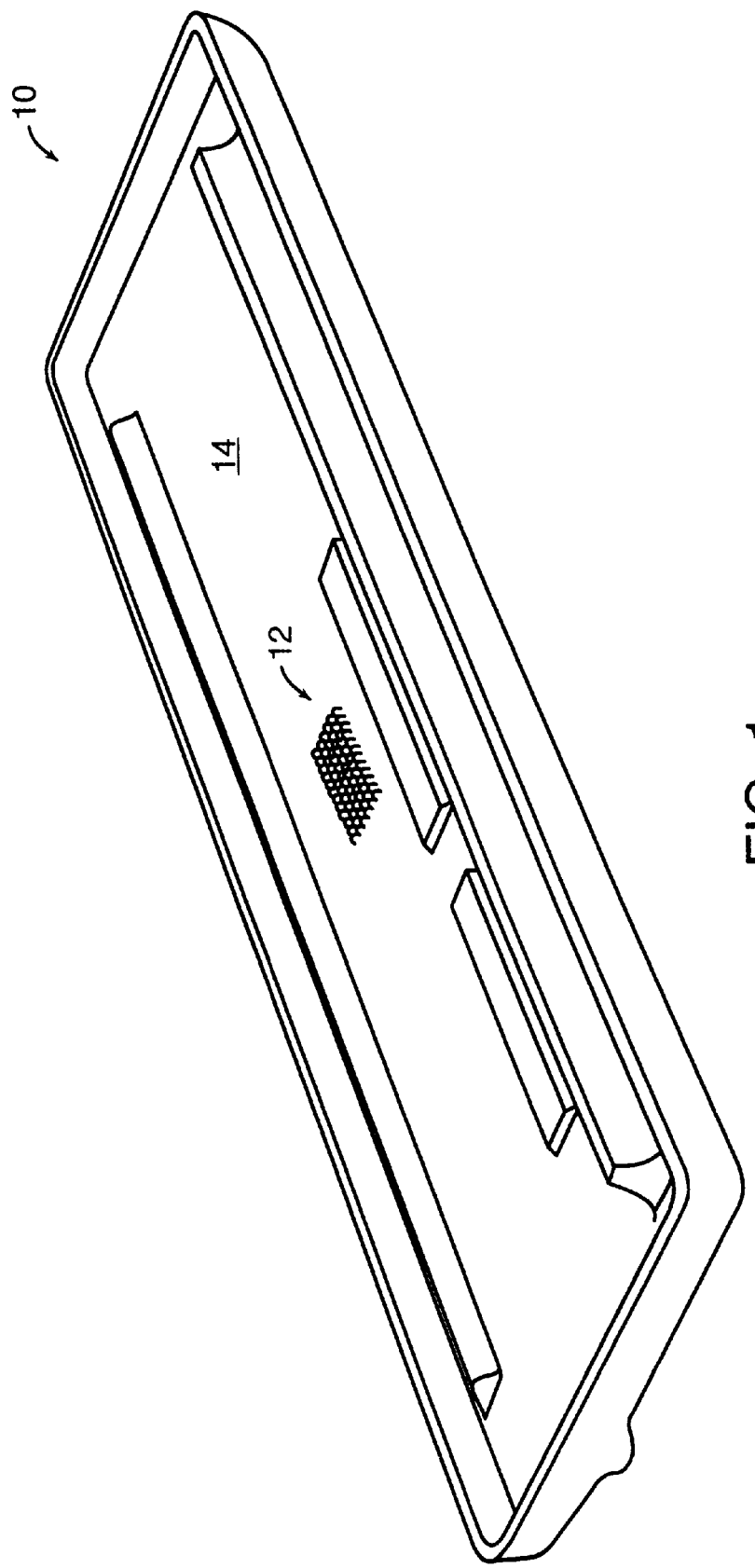
FIG. 1 is a perspective view of an injection molded piece of automotive trim provided with a small array of fastener elements.

Referring to FIG. 1, an injection molded automotive trim piece 10 has an array 12 of miniature hook-form fastener elements integrally molded with and extending from a broad surface 14. The array of fastener elements is provided for releasable attachment of trim piece 10 to supporting structure in use. In many applications, the fastener element array encompasses a very small percentage of the area of surface 14, such that the array covers less than about 5 percent, or even less than about 2 percent, of the surface area of the product 10.

Figure 2A:
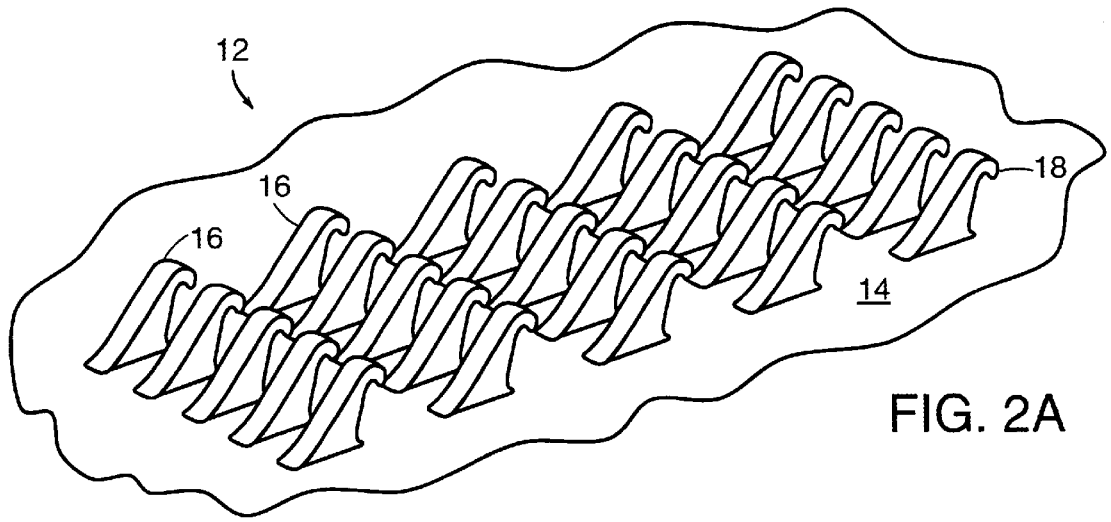
FIGS. 2A and 2B show examples of fastener element arrangement within the array.
Figure 2B:
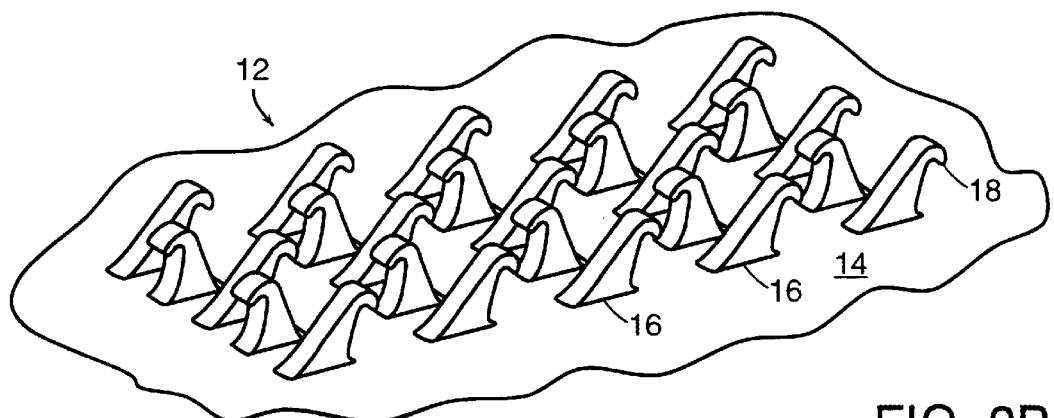

FIGS. 2A and 2B illustrate two examples of fastener element arrangement within array 12. In FIG. 2A, for instance, all of the fastener elements 16 are arranged in rows and oriented to face in a common direction. In FIG. 2B, fastener elements 16 are arranged in rows, with the elements of adjacent rows facing in opposite directions. As shown, hook-form elements 16 have flat broad sides and extend from a base at surface 14 to a crooked tip 18. In other embodiments, at least one broad side of each fastener element is convex. Generally, fastener elements 16 have heights of less than 0.150 inches and the array typically includes more than 100 fastener elements per square inch, and in some cases greater than 500 fastener elements per square inch. In this embodiment, fastener elements 16 are hook-shaped, but other shapes are also suitable.

Figure 3A:
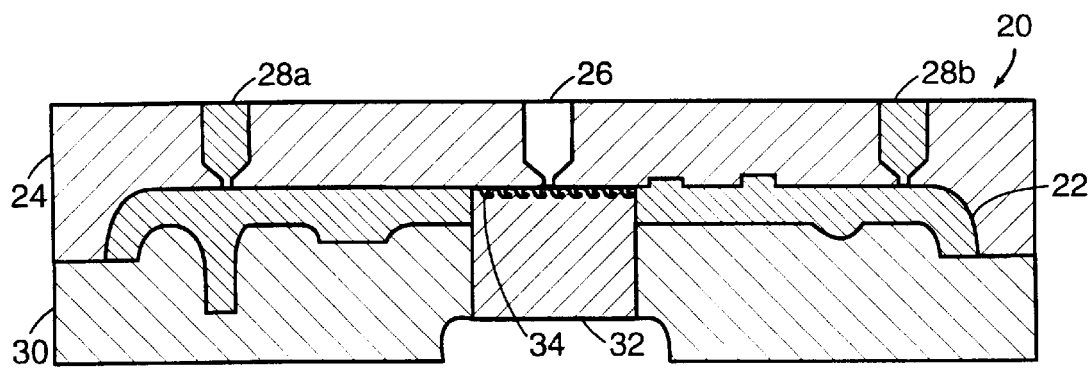
FIGS. 3A–3C sequentially illustrate a first method and mold for injection molding the product of FIG. 1.
Figure 3B:
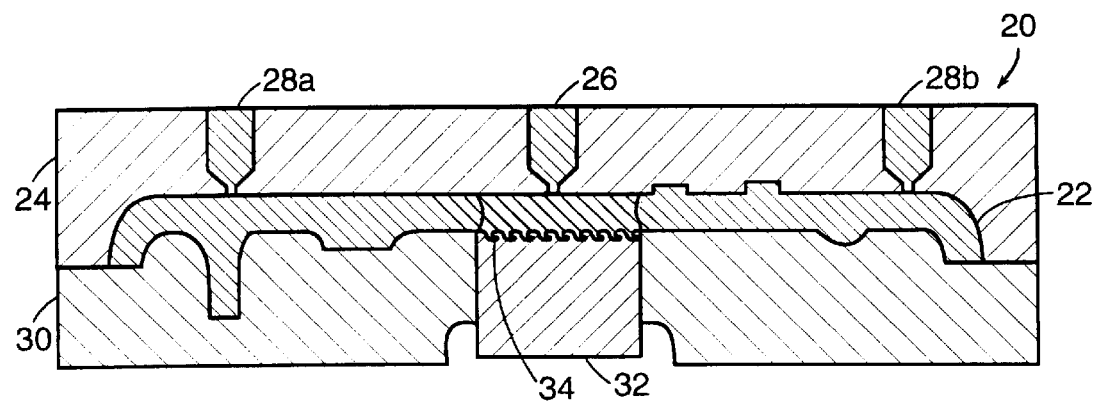
Figure 3C:
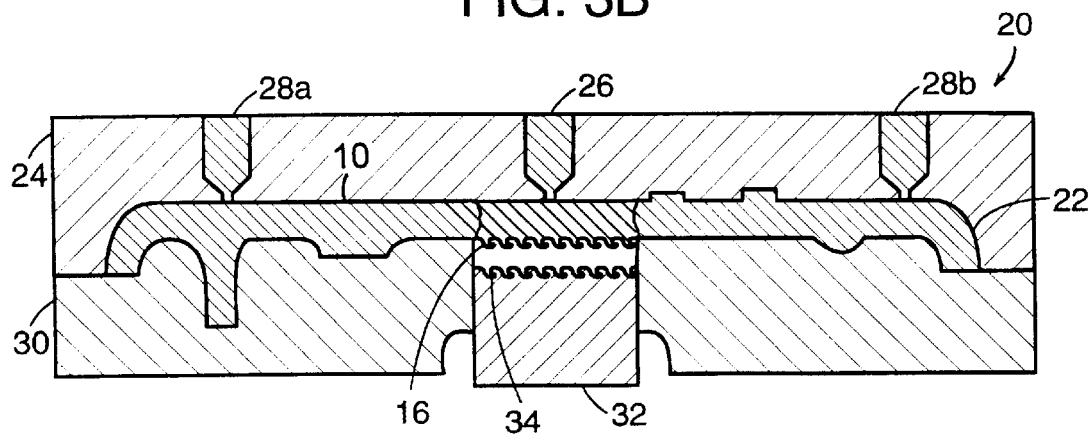

Referring to FIGS. 3A–3C, product (e.g., trim piece) 10 is injection molded in a mold die 20 defining a main cavity 22 for forming the overall shape of the finished product. Die 20 consists of an upper die half 24, containing gates 26, 28a and 28b for injecting molten resin into the die cavity, and a lower die half 30 for forming surface 14 of the product (FIG. 1).

Lower die half 30 also contains a moveable fastener element mold block 32 for forming the array of fastener elements. Block 32 defines an array of enclosed and non-opening fastener element mold cavities 34 extending from its distal surface for forming the fastener elements.

During a molding cycle, molten resin is initially injected into the closed mold die through gates 28a and 28b, while block 32 is held in an extended position up against the inner surface of upper die half 24, such that the majority of the volume of cavity 22 (in this case, more than 90 percent of the volume) is filled with resin, during which time resin flow is essentially blocked from cavities 34, as shown in FIG. 3A. Ideally, the distal surface of block 32 and the inner surface of upper die half 24 have cooperating contours, at least about the perimeter of the distal surface of block 32, such that an effective seal is formed between them to avoid excessive flash which might block the openings of fastener element cavities 34 from subsequent filling.

After the exposed portions of cavity 22 have been sufficiently filled, resin pressure at gates 28a and 28b is reduced and block 32 is retracted to a molding position in which its distal surface is aligned with the surrounding inner surface of cavity 22, as defined by lower die half 30 (as shown in FIG. 3B), and a second type of resin is injected, via gate 26, into fastener element cavities 34 and the portion of cavity 22 previously occupied by block 32 in its extended position. Thus the amount of resin injected through gate 26, during the filling of fastener element cavities 34, is relatively small and therefore quickly injected and raised to a pressure sufficient to completely fill the fastener element cavities. The movement of block 32 may be, for example, hydraulically or pneumatically driven and timed to occur after a particular pressure within cavity 22 has been reached, or after a preselected length of time after injection. In other cases, block 32 may be biased against upper die half 24 by a spring (not shown), such that the pressure of resin from gate 26 pushes block 32 away from the upper die half.

After the resin in fastener element cavities 34 has cooled sufficiently to solidify the fastener elements, block 32 is further retracted to a release position (as shown in FIG. 3C) to pull the molded fastener elements from their cavities. With the fastener elements free of their cavities, the die is opened and the finished product ejected without having to peel the fastener elements out during ejection.

Figure 4A:
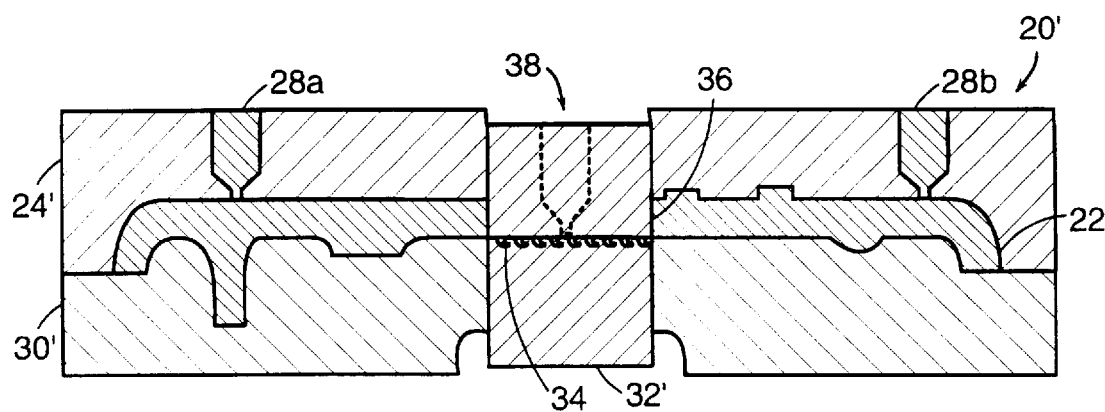
FIGS. 4A–4B sequentially illustrate a second method and mold for injection molding the product of FIG. 1.
Figure 4B:
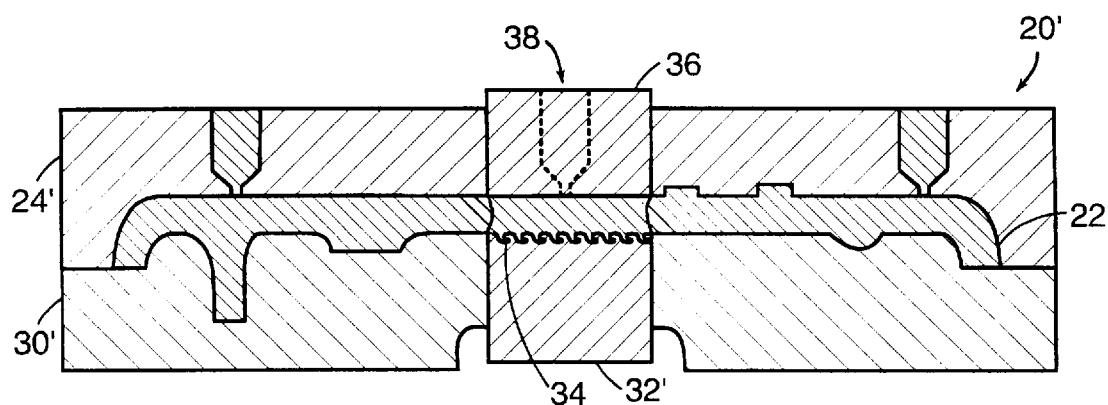

In a second embodiment, illustrated in FIGS. 4A and 4B, fastener element mold block 32' is stationary, affixed to the surrounding portions of lower die half 30'. Upper die half 24' of mold die 20' includes a moveable block 36 arranged directly opposite block 32' and adapted to move between extended (FIG. 4A) and retracted (FIG. 4B) positions during the mold cycle. With block 36 extended, flow of resin from gates 28a and 28b is blocked from entering fastener element cavities 34, as in FIG. 3A. As block 36 is retracted, resin is injected into the fastener element cavities and the space vacated by the retraction of the block, via a gate 38 within moveable block 36. By injecting resin to fill the fastener element cavities while the moveable block is in motion (either in this embodiment or the one of FIGS. 3A–3C), resin flow may be maintained at an advantageously constant rate in order to maintain high pressure throughout the filling process. Filling during retraction also helps to reduce any tendency to pull resin from the already filled portions of cavity 22 into the space vacated by the retracting block.

Figure 5:
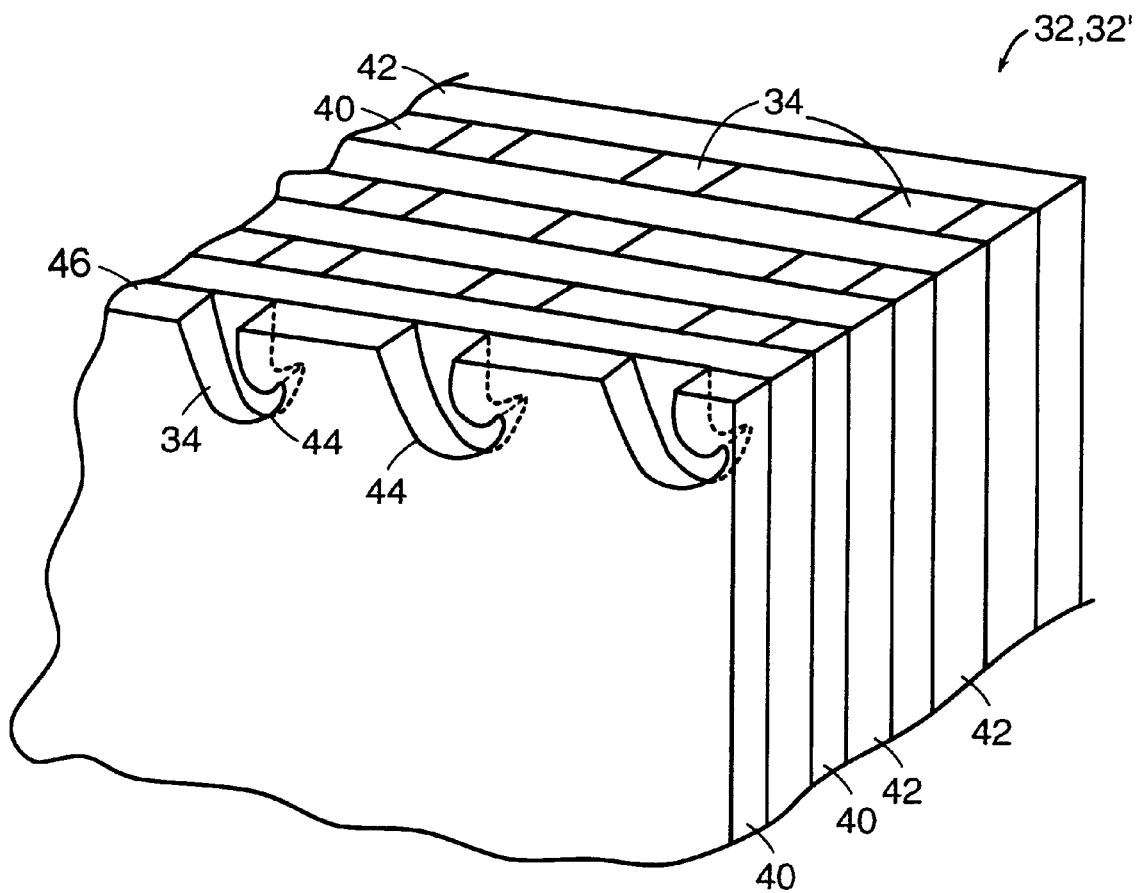
FIG. 5 illustrates the structure of the mold block employed to mold the array of fastener elements.

FIG. 5 illustrates the construction of fastener element mold blocks 32 and 32', which contain a stack of thin mold plates 40 and spacer plates 42. Mold plates 40 each have a series of through-cut apertures 44 along one edge which, when sandwiched between adjacent spacer plates 42, form the fastener element cavities 34. Together, the distal edges of the plates form a surface 46 from which the fastener element cavities extend into the block. The stack of mold and spacer plates is held together in compression by appropriately heavy end plates and tension bolts (not shown), and the entire compressed block is either attached to the rest of the lower die half (as in the embodiment of FIGS. 4A–4B), or connected to appropriate means for extending and retracting the assembled block (as in the embodiment of FIGS. 3A–3C). At no time during the mold cycle do mold plates 40 and spacer plates 42 move relative to one another, and therefore the fastener element cavities they define remain closed and static. As the fastener element cavities do not open, the overhanging portions of the molded fastener elements must distend as the fastener elements are pulled from their cavities.

Figure 6A:
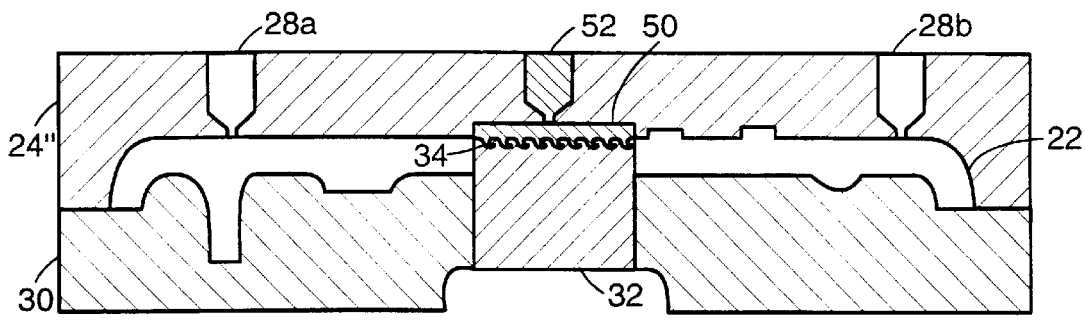
FIGS. 6A–6C sequentially illustrate a third method and mold for injection molding the product of FIG. 1.
Figure 6B:
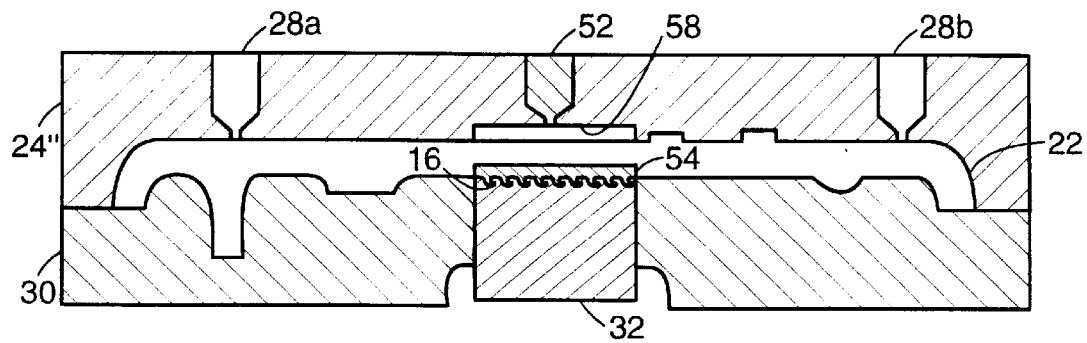
Figure 6C:
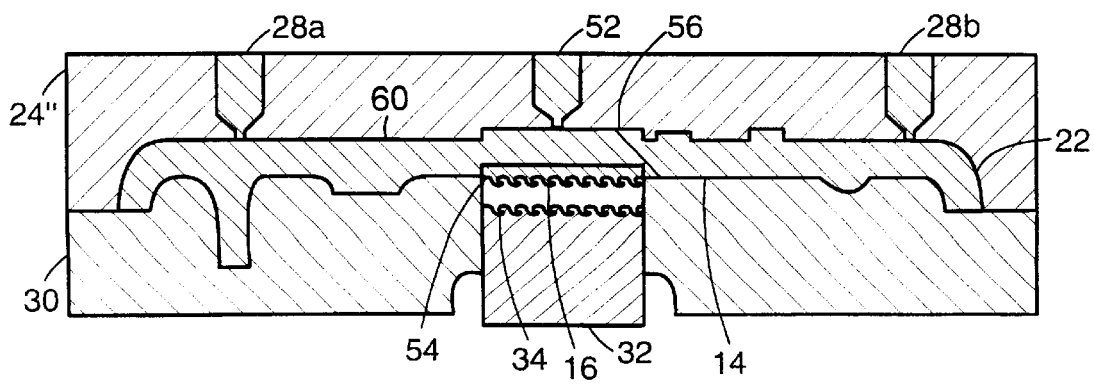

In a third embodiment, illustrated in FIGS. 6A–6C, moveable fastener element mold block 32 is first extended into upper die half 24" to enclose a thin fastener element base cavity 50 between the upper die half and the distal end of block 32. With mold block 32 in this extended position, a first type of resin is injected into fastener element cavities 34 and base cavity 50 via a gate 52 defined in the upper die half (FIG. 6A). The injected resin is allowed to partially cool and mold block 32 is retracted to a molding position (FIG. 6B) in which the upper surface of the mold block is aligned with the surrounding mold surface of lower die half 30 and the upper surface and sides of the molded fastener element base 54 are exposed within cavity 22. The hook-free surfaces of molded base 54 may be textured to promote subsequent bonding with surrounding resin, but should not have protrusions which would keep the base from being freely pulled from cavity 50 as block 32 retracts.

The thickness of fastener element base 54, and the corresponding depth of base cavity 50, need only be enough to provide adequate resin flow from gate 52 to all of the fastener element cavities 34 of the array, and to provide sufficient base structural integrity to enable pulling of base 54 from its cavity 50 by the retraction of block 32. Depending on the type of resin used to mold base 54 and fastener elements 16, the thickness of base 54 may be as little as 0.025 to 0.050 inch. Preferably for many applications, the thickness of base 54 will be as low as possible in order to minimize the height of the raised portion 56 of the product, formed within base cavity 50 opposite the array of fastener elements. Where appropriate, this raised area 56 may be used to advantage. For instance, the inner face 58 of cavity 50 may be shaped to form a logo or other graphic in the distal surface of the raised area.

With the resin of molded fastener element base 54 still soft and bondable, a second type of resin is injected into cavity 22 via gates 28a and 28b, filling the cavity and surrounding and bonding with the previously injected fastener element base, as shown in FIG. 6C. After base 54 has sufficiently bonded with the surrounding resin, block 32 may be further retracted to release fastener elements 16, as described above with reference to FIG. 3C.

The above molding process enables the injection, within a single cavity and without the need for inserts, of a complete product 60 having an array of fastener elements 16 integrally molded with and extending from a relatively small region of a surface 14 of the product. By selecting appropriate resin properties, a product formed primarily of one resin type (selected, for example, for its low cost or for its aesthetic qualities) may have formed with it in a permanently bonded state an array of fastener elements of another resin type (selected, for example, for its high strength or for its high ductility).

Alternatively, the entire mold cavity 22 may be filled through gate 52, thus forming the entire product of a single resin type but providing the advantages discussed above of filling the fastener element cavities in a separate step from the filling of the bulk of the main cavity 22.

Additional embodiments are also within the scope of the following claims.

What is claimed is:

1. An injection mold for forming a molded product having an array of fastener elements integrally molded with and extending from a surface of the product, the mold comprising:
   a first mold part having a mold surface with a region having an array of fastener element cavities extending therefrom for molding the fastener elements; and
   a second mold part having a mold surface aligned with the mold surface of the first mold part to define therebetween, in a closed condition, a mold cavity constructed to receive molten plastic for molding the product, the mold cavity having a first portion comprising a majority of the volume of the mold cavity, and a second portion contiguous with the first portion and defined in part by the region of the first mold part surface having the array of fastener element cavities;
   at least one of the first and second mold parts having a moveable segment constructed to be retracted across the mold cavity, after substantially filling of the first portion of the mold cavity with said plastic and before filling of the fastener element cavities with said plastic, from a flow-inhibiting position, in which the moveable segment inhibits flow of the molten plastic into the second portion of the mold cavity and the fastener element cavities while the first portion of the mold cavity is substantially filled with plastic, to a flow-enabling position, in which the moveable segment enables flow of the plastic into the second portion of the mold cavity and the fastener element cavities, to enable the fastener element cavities and the first portion of the mold cavity to be filled under different molding conditions.

2. The injection mold of claim 1 wherein the first mold part includes said moveable segment, the segment having a surface comprising the region with the array of fastener element cavities.

3. The injection mold of claim 2 wherein the movable segment is constructed to further retract, after the fastener element cavities have filled, from its flow-enabling position to pull the molded fastener elements from their cavities.

4. The injection mold of claim 1 wherein the second mold part includes said moveable segment, the segment being arranged opposite the array of fastener element cavities of the first mold part.

5. The injection mold of claim 4 wherein the moveable segment includes a gate for filling the second portion of the mold cavity.

6. The injection mold of claim 1 wherein the fastener element cavities are defined entirely by surfaces that remain in fixed position relative to each other throughout molding and release of the fastener elements.

7. The injection mold of claim 1 wherein the segment is constructed to be moved across the mold cavity to contact, in its flow-inhibiting position, an opposite surface defining the mold cavity.

8. The injection mold of claim 7 wherein the segment and said opposite surface together define a seal to block flow to the fastener element cavities with the segment in its flow-inhibiting position.

9. The injection mold of claim 1 defining both a first gate and a second gate arranged to provide molten plastic to the mold cavity, the first gate arranged to provide molten plastic to substantially fill the fastener element cavities and the second gate arranged to provide molten plastic to substantially fill the first portion of the mold cavity.

10. The injection mold of claim 9 wherein the first gate is constructed to provide a different type of molten plastic than the second gate.

11. An injection mold for forming a molded product having an array of fastener elements integrally molded with and extending from a surface of the product, the mold comprising:
   a first mold part having a mold surface with a region having an array of fastener element cavities extending therefrom for molding the fastener elements; and
   a second mold part having a mold surface aligned with the mold surface of the first mold part to define therebetween, in a closed condition, a mold cavity constructed to receive molten plastic for molding the product, the mold cavity having a first portion comprising a majority of the volume of the mold cavity, and a second portion contiguous with the first portion and defined in part by the region of the first mold part surface having the array of fastener element cavities;
   at least one of the first and second mold parts having a moveable segment constructed to be retracted across the mold cavity, after filling of the fastener element cavities with said plastic and before filling the first portion of the mold cavity with said plastic, from a flow-inhibiting position, in which the moveable segment inhibits flow of the molten plastic into some of the second portion of the mold cavity while the fastener element cavities are filled with plastic, to
   a flow-enabling position, in which the moveable segment enables flow of the molten plastic into all remaining unfilled regions of the second portion of the mold cavity, to enable the fastener element cavities and the first portion of the mold cavity to be filled under different molding conditions.

* * * * *